(12) United States Patent
Tsunoda et al.

(10) Patent No.: US 8,610,982 B2
(45) Date of Patent: Dec. 17, 2013

(54) IMAGE FORMING APPARATUS

(75) Inventors: Shinichi Tsunoda, Kanagawa (JP); Naoya Yamasaki, Kanagawa (JP); Shunichiro Shishikura, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 92 days.

(21) Appl. No.: 13/117,637

(22) Filed: May 27, 2011

(65) Prior Publication Data

US 2012/0140298 A1  Jun. 7, 2012

(30) Foreign Application Priority Data

Dec. 1, 2010  (JP) .................................. 2010-268613

(51) Int. Cl.
*G03F 3/08* (2006.01)
*H04N 1/40* (2006.01)

(52) U.S. Cl.
USPC .......................................... 358/518; 358/449

(58) Field of Classification Search
USPC ................................................. 358/518, 449
See application file for complete search history.

(56) References Cited

U.S. PATENT DOCUMENTS

| 6,320,673 | B1* | 11/2001 | Motosugi ........................ 358/1.9 |
| 2009/0109496 | A1* | 4/2009 | Baba ............................. 358/449 |
| 2010/0053706 | A1* | 3/2010 | Jasinski et al. ................ 358/498 |

FOREIGN PATENT DOCUMENTS

JP    3649845 B2    2/2005

* cited by examiner

*Primary Examiner* — Twyler Haskins
*Assistant Examiner* — Henok Shiferaw
(74) *Attorney, Agent, or Firm* — Sughrue Mion, PLLC (57) ABSTRACT

An image forming apparatus includes an image reader that covers an image recorded material placed on a reading surface with an openable cover plate so as to press thereof and optically reads an image of the image recorded material, an image output unit that forms an image on a recording sheet and outputs the image, a detecting unit that detects an opened/closed state of the cover plate when the image output unit forms a gradation test image on the recording sheet, the recording sheet having the gradation test image formed thereon is placed on the reading surface of the image reader, and an operation of reading the gradation test image is performed, and a gradation correction unit that conducts a gradation correction of the image forming apparatus based on an image read by the image reader when the detecting unit detects the closed state of the cover plate.

6 Claims, 11 Drawing Sheets

IMAGE FORMING APPARATUS

CROSS-REFERENCE TO RELATED APPLICATION

This application is based on and claims priority under 35 USC 119 from Japanese Patent Application No. 2010-268613 filed on Dec. 1, 2010.

BACKGROUND

1. Technical Field

The present invention relates to an image forming apparatus.

2. Related Art

Some image forming apparatuses, such as copiers and printers, have a function of correcting the gradation of images. As a method of correcting the gradation in the image forming apparatus, a method has been used in which an image output unit forms a gradation test image on a recording sheet and outputs a gradation test image sheet, an optical image reader reads the gradation test image formed on the recording sheet set on the image reader by a person, and the read information (image density) is used to create information (gradation correction information) for correcting gradation. In addition, in general, the image recorded material having an image formed thereon is placed on the reading surface of the image reader and an openable cover plate (known as a document cover or a lid) covers the image recorded material so as to be pressed against the reading surface. In this state, the image reader reads the image.

SUMMARY

According to an aspect of the invention, there is provided an image forming apparatus including:

an image reader that covers an image recorded material placed on a reading surface with an openable cover plate so as to press thereof and optically reads an image of the image recorded material;

an image output unit that forms an image on a recording sheet and outputs the image;

a detecting unit that detects an opened/closed state of the cover plate when the image output unit forms a gradation test image on the recording sheet, the recording sheet having the gradation test image formed thereon is placed on the reading surface of the image reader, and an operation of reading the gradation test image is performed; and a gradation correction unit that conducts a gradation correction of the image forming apparatus based on an image read by the image reader when the detecting unit detects the closed state of the cover plate.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention (hereinafter, simply referred to as "exemplary embodiments") will be described with reference to the accompanying drawings.

[First Exemplary Embodiment]

Figure 1:
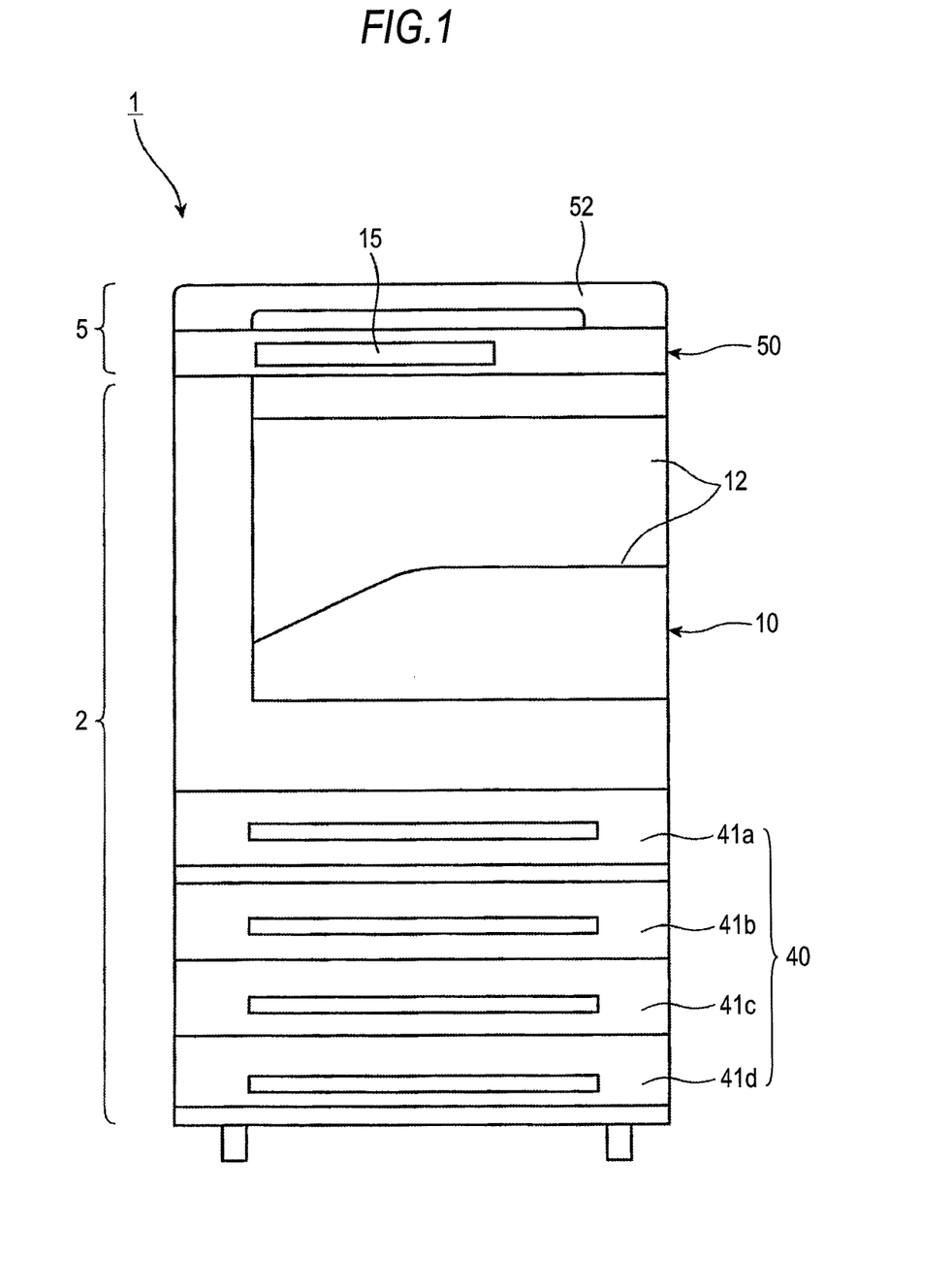
FIG. 1 is a front view illustrating the outward appearance of an image forming apparatus according to a first exemplary embodiment.
Figure 2:
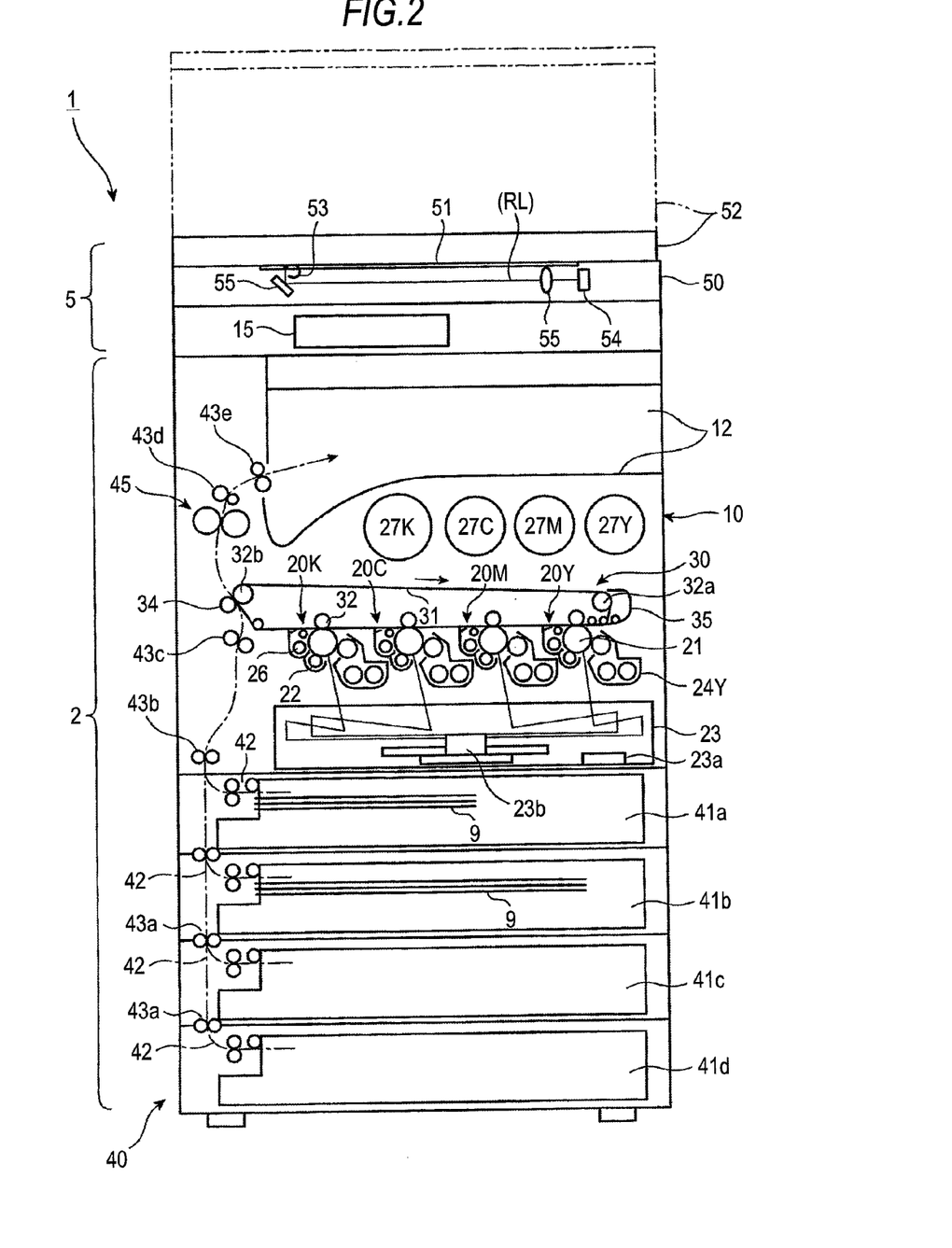
FIG. 2 is a diagram illustrating the internal structure of the image forming apparatus shown in FIG. 1.
Figure 3A:
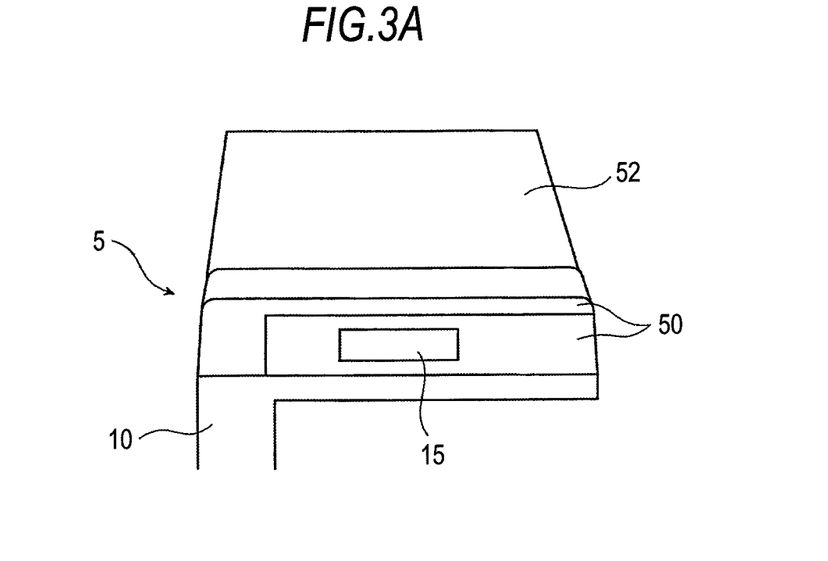
FIGS. 3A and 3B are perspective views schematically illustrating the closed and opened states of a document cover of an image reading device in the image forming apparatus shown in FIG. 1.
Figure 3B:
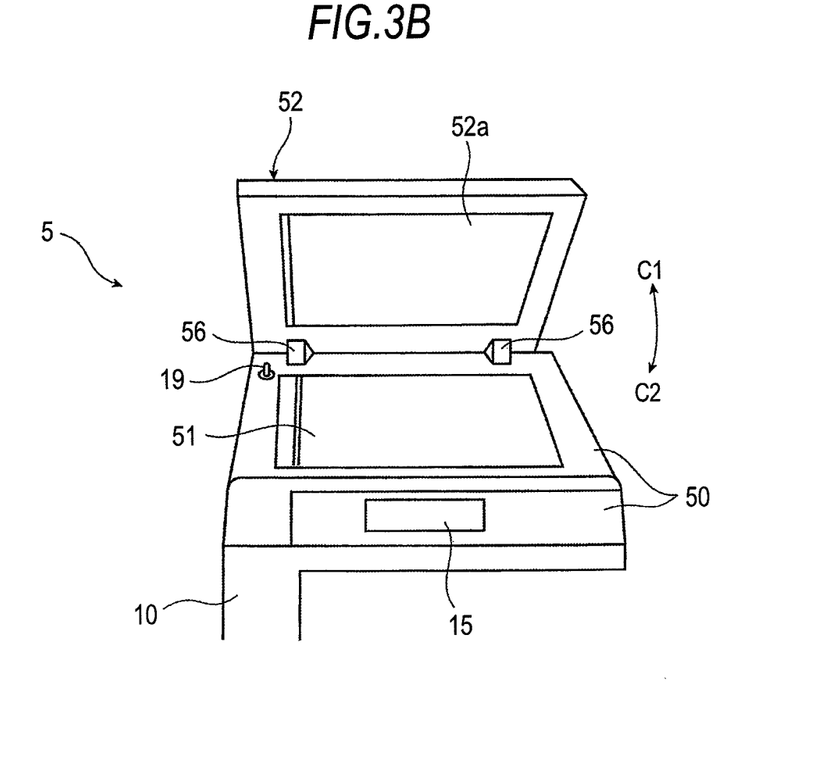

FIG. 1 shows the outward appearance of an image forming apparatus according to a first exemplary embodiment. FIG. 2 shows the internal structure of the image forming apparatus. FIGS. 3A and 3B show the opened and closed states of a document cover of an image reader of the image forming apparatus.

An image forming apparatus 1 according to the first exemplary embodiment is, for example, a color copier. As shown in FIG. 1 or FIG. 2, the image forming apparatus 1 includes an image output device 2 that forms an image on a recording sheet and outputs the image and an image reading device 5 that is provided at an upper part of the image output unit 2.

The image reading device 5 includes, for example, a housing 50, a reading surface 51 which is formed by providing a transparent glass plate in an opening formed in the upper surface of the housing 50 and in which a document on which an image to be read is recorded is placed on the upper surface of the glass plate, an openable document cover 52 that is moved forward or backward so as to cover the reading surface 51 and covers the document so as to be pressed against the reading surface, an illuminating lamp 53 that emits light from an internal space of the housing 50 to the reading surface 51 so as to be incident on the document, an image sensor 54, such as a CCD (Charge-Coupled Device) that receives light RL which is reflected from the reading surface 51 and then returns to the inside of the housing 50 and converts the reflected light into an image signal, and optical system components 55, such as a reflecting mirror and a lens, that guide the light RL reflected from the reading surface 51 to the image sensor 54 such that an image is formed.

For example, as shown in FIGS. 3A and 3B, the document cover 52 is a plate member including a white document pressing surface 52a which is larger than the reading surface 51 and is formed on the inside. The document cover 52 is attached to the rear side of the image forming apparatus 1 and is moved by hinges 56 in the directions of arrows C1 and C2 with respect to the housing 50 of the image reading device 5 such that the reading surface 51 is exposed to the outside and is covered (hereinafter, referred to as "opened and closed states"). In the image reading device 5, a size detecting sensor that detects the size of the document placed on the reading surface 51 is provided in the housing 50. The image reading device 5 is configured such that the illuminating lamp 53 and some of the optical system components 55 are reciprocated at a predetermined speed below the reading surface 51 and the image sensor 54 is fixed on one side. The image reading device 5 maybe configured such that the illuminating lamp 53, the image sensor 54, and the optical system components 55 are integrated into one structure and the integrated structure is reciprocated at a desired speed below the reading surface 51.

As shown in FIG. 2, the image output device 2 includes a housing 10 having, for example, a supporting member and an exterior cover and the following devices provided in the internal space of the housing 10: plural image forming devices 20 that form toner images to be developed with toner, which is a developer, on the basis of input image information; an intermediate transfer device 30 that holds the toner image formed by each of the image forming devices 20 and finally transfers the toner image onto a sheet 9, which is a recording sheet; a sheet feeding device 40 that stores necessary sheets 9 to be supplied to the intermediate transfer device 30 and transports the sheet 9; and a fixing device 45 through which the sheet 9 having the toner image transferred thereto by the intermediate transfer device 30 passes and which fixes the toner image.

The image forming device 20 includes four image forming devices (20Y, 20M, 20C, and 20K) only for forming four toner images, that is, yellow (Y), magenta (M), cyan (C), and black (K) toner images. The four image forming devices 20 (Y, M, C, and K) are arranged in tandem. The image forming devices 20 (Y, M, C, and K) have substantially the same structure, which will be described below.

As shown in FIG. 2, each of the image forming devices 20 (Y, M, C, and K) has a rotating photoconductor drum 21 and the following image forming devices are generally arranged in the vicinity of the photoconductor drum 21. The image forming devices include a charging device 22 that charges an image holding surface (a surface holding the toner image) of the photoconductor drum 21 to a predetermined potential, an exposure device 23 that emits light to the charged image holding surface of the photoconductor drum 21 on the basis of image information (signal) transmitted from an image processor, which will be described below, and forms an electrostatic latent image using a potential difference (for each color), developing devices 24 (Y, M, C, and K) that develop the electrostatic latent images into toner images, which are visible images, with corresponding color (Y, M, C, and K) toners, and a drum cleaning device 26 that scrapes away an adhesive material, such as toner, remaining on the image holding surface of the photoconductor drum 21 after the toner image is primarily transferred onto (the intermediate transfer belt 31 of) the intermediate transfer device 30 and removes the adhesive material.

In the image forming device 20, as the exposure device 23, a scanning-type exposure device is used in which a laser beam that is emitted from a semiconductor laser 23a on the basis of image information is incident on each photoconductor drum 21 through scanning optical system components, such as a rotary multi-sided mirror 23b, a reflecting mirror, and a lens. In addition, for example, a non-scanning-type exposure device including a light emitting diode and optical components may be used as the exposure device 23. In FIG. 2, reference numeral 27 indicates a developer container that stores a developer (generally toner) to be supplied to each developing device 24, and a necessary amount of developer is supplied from each developer container 27 to each developing device 24 through a supply device (not shown).

As shown in FIG. 2, the intermediate transfer device 30 generally includes the endless intermediate transfer belt 31 that is circulated so as to pass through the photoconductor drums 21 of the image forming devices 22 (Y, M, C, and K) arranged in tandem, plural supporting rollers 32a, 32b, ... that support the intermediate transfer belt 31 so as to be rotated through a predetermined path, a primary transfer roller 33 that presses the intermediate transfer belt 31 such that the intermediate transfer belt 31 comes into contact with the photoconductor drums 21 of the image forming devices 22 (Y, M, C, and K) and the toner images formed on each photoconductor drum 21 are primarily transferred onto the intermediate transfer belt 31, a secondary transfer roller 34 that comes into contact with the intermediate transfer belt 31 supported by the supporting roller 32b with predetermined pressure and is rotated, and a belt cleaning device 35 that removes, for example, toner remaining on the intermediate transfer belt 31 after the intermediate transfer belt 31 passes through the secondary transfer roller 34. The supporting roller 32a is a driving roller.

The sheet feeding device 40 includes plural sheet trays 41a to 41d that store desired kinds of sheets 9 with desired sizes so as to be stacked on and a transport device 42 that transports the sheets 9 one by one from each of the sheet trays 41. In the first exemplary embodiment, the sheet tray 41 has a box shape with an open upper surface, and different kinds of sheets 9 with different sizes are stored in the sheet trays 41. The necessary sheet 9 can be selected from the sheet trays 41 for the purpose of use of the transport device 42 and be transported. In addition, a detecting sensor that detects the size of the stored sheet is provided in each of the sheet trays 41.

In FIG. 2, a one-dot chain line with an arrow indicates the transport path of the sheet 9. For example, plural transport roller pairs 43a to 43e and a transport guide member (not shown) are arranged along the sheet transport path (transport path). The transport roller pair 43c is a pair of transport rollers having, for example, a function of adjusting the transport time or transport position of the sheet 9. The transport roller pair 43e is a pair of discharge rollers that discharges the sheet 9 having images formed thereon to a discharged sheet container 12 which is provided in the housing 10.

For example, as shown in FIGS. 1 and 2, in the image forming apparatus 1, an operation panel 15, serving as a user interface (UI), is provided on the front surface of the housing 50 of the image reading device 5.

The operation panel 15 includes an input unit which has, for example, a numerical keypad, various kinds of buttons, and a touch panel for performing various kinds of input operations, such as the selection of each operation of the image forming apparatus and the setting of operation conditions, and a display which has, for example, a liquid crystal screen and a lamp for displaying various kinds of information, such as the content of the operations and the setting of the operations. In the image forming apparatus 1, the input unit of the operation panel 15 can be used to input settings or instructions to perform an image forming operation under desired conditions. In addition, necessary information is displayed on the display of the operation panel 15. The input unit and the display of the operation panel 15 can be used to select an automatic gradation correction mode, which will be described below, or instruct the start of an operation. Information required for performing various kinds of operations or the automatic gradation correction mode is displayed on the display of the operation panel 15.

Figure 4:
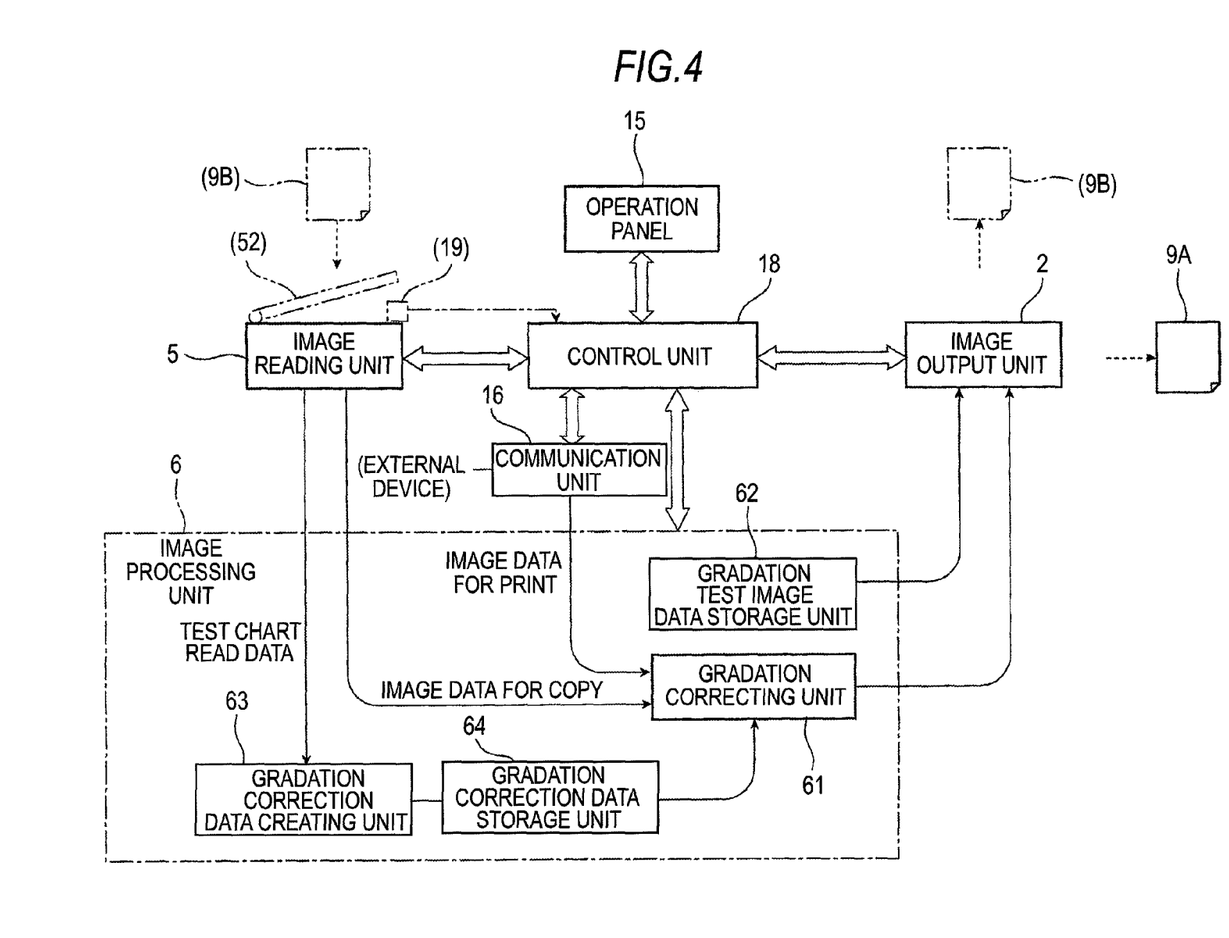
FIG. 4 is a block diagram illustrating the structure of a control system of the image forming apparatus or a structure related to a gradation correction mode.

As shown in FIG. 4, in the image forming apparatus 1, the image output device 2 is provided with an image processing device (image processor) 6. In FIG. 4, a solid arrow indicates the transmission path of various kinds of data.

The image processing device 6 performs predetermined image processing on image data for copying which is read from the image reading device 5 and is then input or image data for printing which is input from an external connection device (for example, a terminal, such as a personal computer, or an information transmission medium, such as an information medium) provided outside the image forming apparatus 1 through a communication unit 16. The image processing device 6 includes a gradation correcting unit 61 that performs a gradation correcting process which is one kind of image processing. In FIG. 4, image processors other than the gradation correcting unit are not shown. The gradation correcting unit 61 corrects the gradation of the image data for copying or the image data for printing input to the image output device. The image information (signal) subjected to necessary image processing, such as the gradation correcting process of the gradation correcting unit 61, is transmitted to the exposure device 23 of the image output device 2.

As shown in FIG. 4, in the image forming apparatus 1, a control unit (controller) 18 controls the operations of, for example, the image forming apparatus 2, the image reading device 5, the image processing device 6, the operation panel 15, and the communication unit 16. In FIG. 4, a white bidirectional arrow indicates a control bus.

The control unit 18 includes, for example, a processor, a storage element (for example, a RAM or a ROM), a storage device (hard disk), a controller, and an input/output device. The control unit 18 performs a calculation process based on a control program and data stored in the storage element (ROM) or the storage device in response to instructions transmitted from, for example, the operation panel 15 or the external connection device, or on the basis of detection data transmitted from, for example, various kinds of detecting sensors, thereby performing a necessary control operation. In addition, the control unit 18 performs a calculation process or a control operation required to perform the automatic gradation correction mode, which will be described below.

Next, a basic image forming operation of the image forming apparatus 1 will be described.

The image forming apparatus 1 performs a copying operation based on the data for copying read from a document by the image reading device 5 and a printing operation based on the data for printing input from the external connection device. When the copying operation is performed, the user places a document on the reading surface of the image reading device 5, closes the document cover 52, and uses the operation panel 15 to start the copying operation. When the printing operation is performed, the user selects data to be printed from the external connection device and issues an instruction to perform the printing operation.

When the control unit 18 receives an instruction to start the copying operation or the printing operation, the image output device 2 and the image reading device 5 (optional) start up. In this case, in the image output device 2, the image processing device 6 performs necessary image processing on input image data for copying or image data for printing and the processed image data is transmitted to the exposure device 23. In the copying operation, the image reading device 5 reads a document.

Next, an image forming operation pattern (full color mode) that forms a full color image including four color (Y, M, C, K) toner images formed by all of the four image forming devices 20 (Y, M, C, and K) will be described.

In the image forming operation in the full color mode, first, in the four image forming devices 20 (Y, M, C, and K) of the image output device 2, each photoconductor drum 21 is rotated in a predetermined direction, and each charging device 22 charges the image holding surface of each photoconductor drum 21 with a necessary polarity (in the first exemplary embodiment, a negative polarity) and potential. Then, the exposure device 23 emits light to the image holding surface of the charged photoconductor drum 21 on the basis of image data decomposed into each color component (Y, M, C, and K) transmitted from the image processing device 6 to form electrostatic latent images of each color component which are formed by a predetermined potential difference. Then, each developing device 24 supplies corresponding color (Y, M, C, K) toners charged with a predetermined polarity (negative polarity) to the electrostatic latent images of each color component formed by the photoconductor drums 21 and electrostatically attaches the color toners. In this way, the electrostatic latent images of each color component are developed into four visible color toner images with the corresponding color toners.

Then, the primary transfer roller 33 of the intermediate transfer device 30 primarily transfers each color toner image formed on the photoconductor drums 21 of the image forming devices 2 (Y, M, C, and K) onto the intermediate transfer belt 31 so as to be sequentially superimposed on each other. Then, the intermediate transfer device 30 holds the toner images primarily transferred to the intermediate transfer belt 31 and transports the toner images to a secondary transfer position. The secondary transfer roller 34 collectively secondarily transfers the toner images onto the sheet 9 transported from the sheet feed device 40. The sheet 9 having the toner images secondarily transferred thereto is separated from the intermediate transfer belt 31 and is guided to the fixing device 45. Then, a predetermined fixing process (heating and pressing) is performed on the sheet 9 to fix the toner images. In the single-side printing mode, the sheet 9 having the toner images fixed thereto is discharged and stored in, for example, the discharged-sheet container 12 provided in the housing 10. In this way, a sheet 9A (see FIG. 4) having a full color image, which is a combination of four color toner images, formed thereon is output.

Next, the automatic gradation correcting function of the image forming apparatus 1 will be described.

When the user wants to adjust the color of the image output from the image output device 2, the user uses the operation panel 15 to select and instruct the automatic gradation correction mode, thereby performing automatic gradation correction. When the gradation correction is performed, gradation correction data used by the gradation correcting unit 61 of the image processing device 6 is corrected. As shown in FIG. 4, the image processing device 6 includes a gradation test image data storage unit 62, a gradation correction data creating unit 63, and a gradation correction data storage unit 64 in order to perform the automatic gradation correction. In addition, for example, a storage device of the control unit 18 stores a control program or data required to perform an automatic gradation correction mode operation, which will be described below.

The gradation test image data storage unit 62 stores the data (gradation test image data) of a gradation test image 7 which is used to create a test chart 9B required to test the current gradation characteristics. When the automatic gradation correction mode is performed, the gradation test image data for creating the test chart 9B is transmitted to the image output device 2 (exposure device 23).

Figure 5:
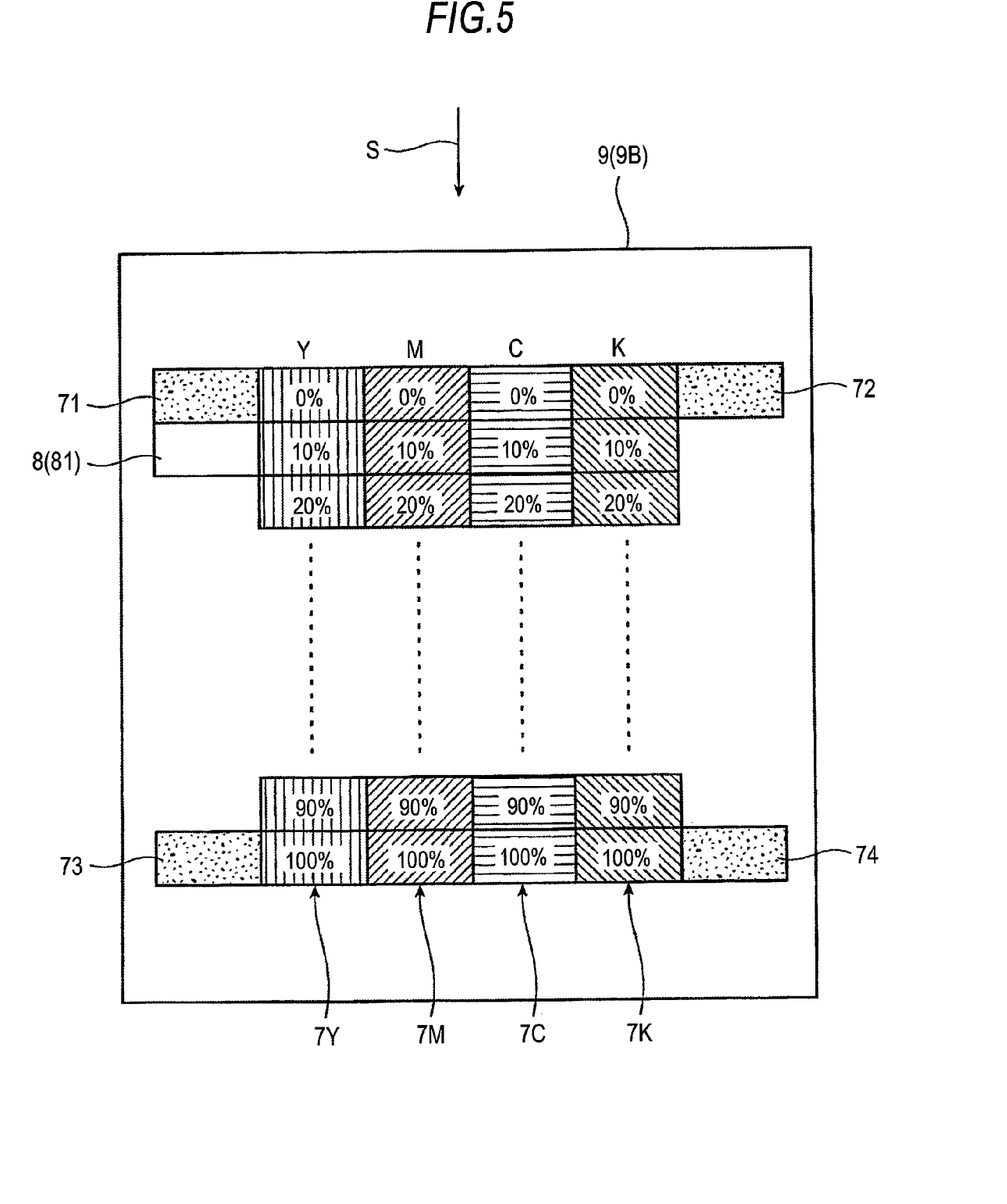
FIG. 5 is a plan view illustrating the structure of a test chart used in an automatic gradation correction mode and the structure of a detection region (white portion) used in the first exemplary embodiment.

As shown in FIG. 5, the gradation test image 7 includes four color (Y, M, C, K) fixed toner images (patch images) with different densities (image area ratios: Cin). The gradation test image 7 shown in FIG. 5 is formed by arranging four color fixed toner images 7 (Y, M, C, and K) on the sheet 9 with a predetermined size in series such that the image area ratio is changed from 0% to 100% at an interval of 10% from the upstream side to the downstream side in the reading direction (direction represented by an arrow S in FIG. 5) of the image reading device 5.

In FIG. 5, reference numerals 71 to 74 indicate positioning toner images for checking the position of the gradation test image 7. The image reading device 5 reads the positional information of the positioning toner images 71 to 74, thereby checking the position (for example, a start position and an end position) of the gradation test image 7 or the arrangement state of the sheet 9 (test chart 9B) having the gradation test image 7 formed thereon, that is, the position and direction of the sheet 9 on the reading surface 51 of the image reading device 5. The positioning toner images 71 to 74 are formed at four corners of the edge of the gradation test image 7, and are formed with toner having a color and an image area ratio different from those of adjacent fixed color toner images. In this way, the positioning toner images 71 to 74 are clearly discriminated from the gradation test image 7 and are accurately read.

The gradation correction data creating unit 63 creates gradation correction data on the basis of the read data of the gradation test image 7 of the test chart 9B read by the image reading device 5. The gradation correction data is for correcting the gradation of the toner images with different densities in the read data so as to be close to desired characteristics (standard gradation correction data). In general, a screen for copying an image and a screen for printing an image are switched to form the test charts 9B in which the gradation correction images 7 are individually formed, thereby creating gradation correction data for copying an image and gradation correction data for printing an image. The gradation correction data storage unit 64 stores the latest gradation correction data created by the gradation correction data creating unit 63. In addition, during an image forming operation, the gradation correction data storage unit 64 transmits necessary gradation correction data to the gradation correcting unit 61.

Next, the operation of the image forming apparatus 1 in the automatic gradation correction mode will be described.

Figure 6:
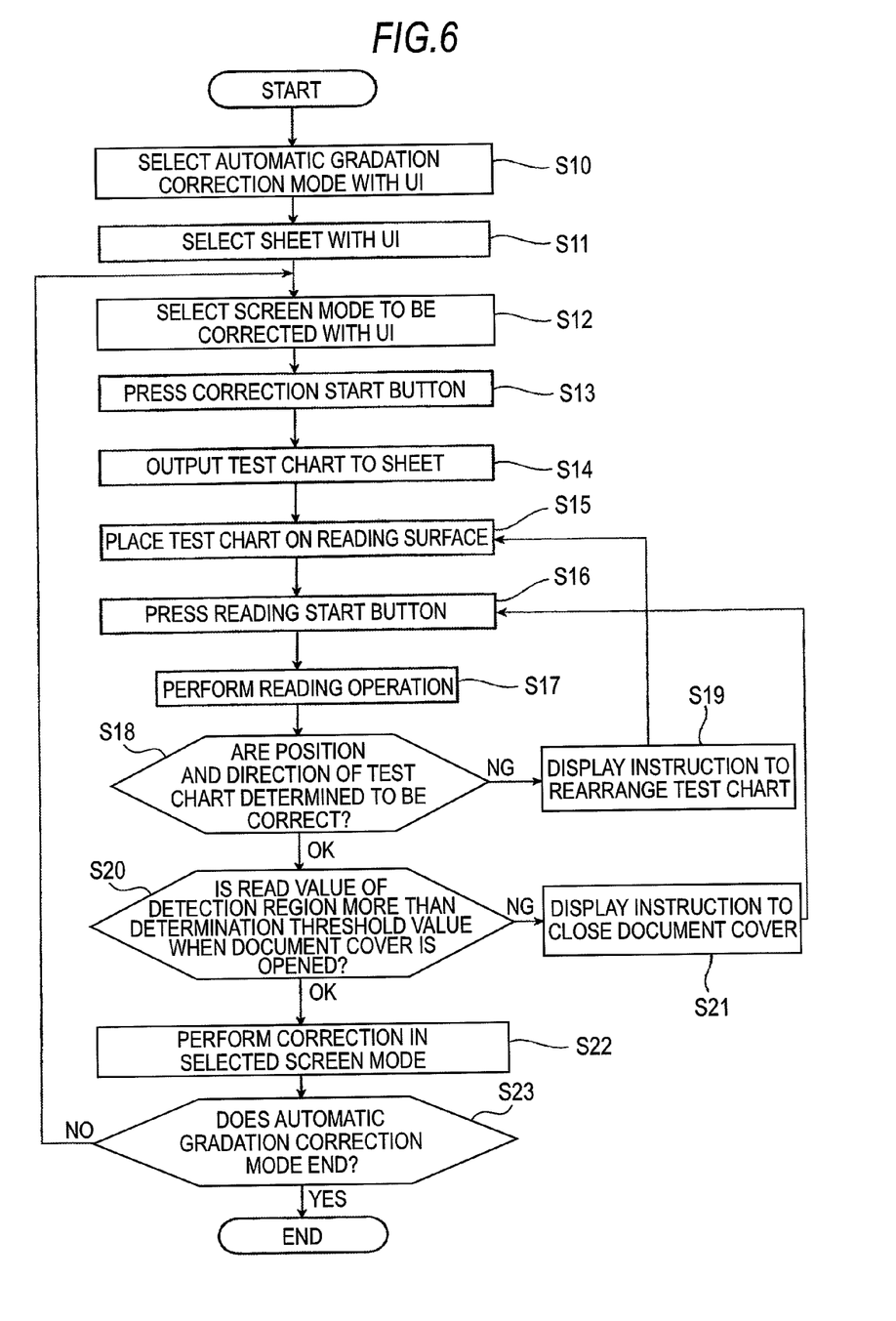
FIG. 6 is a flowchart illustrating the content of an operation when the automatic gradation mode is selected in the first exemplary embodiment (including the second and third exemplary embodiments)

First, as shown in, for example, FIGS. 3A and 3B and FIG. 6, the user operates the operation panel (UI) 15 to select the automatic gradation correction mode (Step: S10). For example, the user presses a button for selecting the "automatic gradation correction mode" which is prepared on the menu screen displayed on the display of the operation panel 15, thereby selecting the automatic gradation correction mode.

At that time, the user operates the operation panel 15 to select the sheet 9 used to create the test chart 9B or select a screen to be corrected (S11 and S12). The screen is selected as follows. For example, when gradation correction for a copy image is performed, a screen for copying is selected. When gradation correction for a print image is performed, a screen for printing is selected.

Then, a gradation correction mode start button is pressed (S13). The start button is displayed as, for example, a "correction start button" on the gradation correction mode screen displayed on the display of the operation panel 15.

When the start button is pressed, the image output device 2 creates the test chart 9B (S14). That is, in the image output device 2, the image forming operation is performed on the basis of the gradation test image data transmitted from the gradation test image data storage unit 62 of the image processing device 6 to the exposure device 23 to form the test chart 9B (see FIG. 5) having a fixed toner image as the gradation test image 7 formed on the selected sheet 9 and the sheet 9 is output to the discharged sheet container 12.

Figure 9:
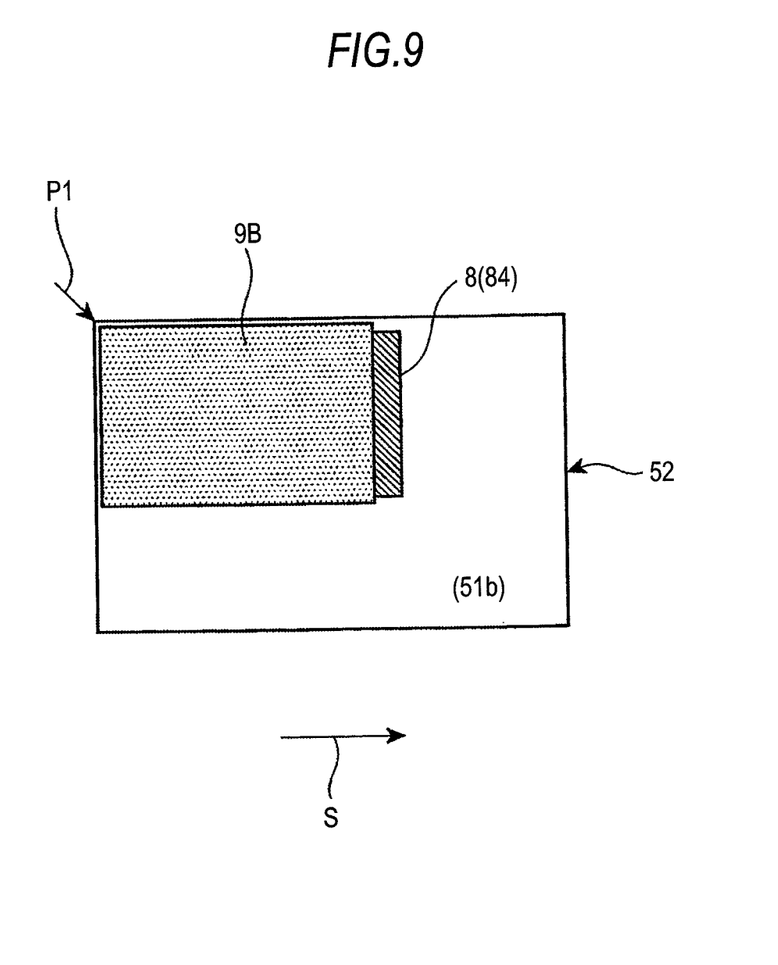
FIG. 9 is a plan view illustrating the structure of a detection region (detection region surface) used in the automatic gradation correction mode in a third exemplary embodiment.

Then, the user places the test chart 9B on the reading surface 51 of the image reading device 2 (S15) and presses a reading start button (S16). At that time, the test chart 9B needs to be exactly placed at a set reference position P1 of the reading surface 51. In FIG. 9, the position indicated by an arrow P1 is the set reference position. After the test chart 9B is placed on the reading surface 51, the document cover 52 needs to be closed. The reading start button is an execution button in the input unit of the operation panel 15.

When the reading start button is pressed, the image reading device 2 reads the test chart 9B (S17). In the image reading device 2, the illuminating lamp 53 emits light to the surface of the test chart 9B and the image sensor 54 receives the light RL reflected from the test chart 9B and converts the amount of light received into an electric signal. Then, the image reading device 2 transmits the electric signal as the read data of the test chart to the gradation correction data creating unit 63 of the image processing device 6 (see FIG. 4).

In the image forming apparatus 1, the data (for example, coordinate data) of the positioning toner images 71 to 74 included in the read data of the test chart is transmitted from the image processing device 6 to the control unit 18. In this way, the control unit 18 knows the position and direction of the test chart 9B on the reading surface 51 of the image reading device 2 and compares the position and direction of the test chart 9B with the reference data of the position and direction of the test chart 9B which is stored in, for example, the gradation test image data storage unit 62 in advance to determine whether the position and direction (that is, the arrangement) of the test chart 9B are correct (S18). Specifically, it is determined whether the arrangement of the test chart is correct on the basis of information indicating, for example, the positional deviation of the test chart 9B and an arrangement error when the arrangement of the test chart is reversed in the vertical direction.

In this case, when it is determined that the arrangement of the test chart 9B is not correct (NG), information to prompt the user to rearrange the test chart 9B correctly is displayed on the display of the operation panel 15 (S19). For example, a message "Please rearrange the test chart correctly" is displayed on the operation panel 15. In an error state in which the test chart 9B is not arranged correctly, for example, the image forming apparatus may sound an alarm or turn on a warning lamp to notify the occurrence of the error to the user, instead of displaying the message.

When it is determined that the arrangement of the test chart 9B is correct (OK), the gradation correction data creating unit 63 of the image processing device 6 creates gradation correction data corresponding to the screen mode selected in Step S12 on the basis of the read data of the test chart transmitted from the image reading device 2 (S22). In this case, the created gradation correction data is transmitted to the gradation correction data storage unit 64 and is then stored therein. In this way, the operation of the instructed automatic gradation correction mode ends. When there is an instruction to perform the gradation correction mode for another screen (S23), the process returns to Step S12 and the above-mentioned operation is repeatedly performed by the same method as described above.

The gradation correction data created in the automatic gradation correction mode is used in the subsequent image forming operation. That is, the image output device 2 corrects the gradation of image data of an image to be formed on the basis of new gradation correction data and the image is formed on the sheet 9 on the basis of the processed image data. In this way, the image output device 2 obtains a good image whose color is corrected by the gradation correction.

However, in some cases, in the automatic gradation correction mode, the user places the test chart 9B on the reading surface 51 of the image reading device 2 and starts the reading operation to perform gradation correction without closing the document cover 52.

Figure 7:
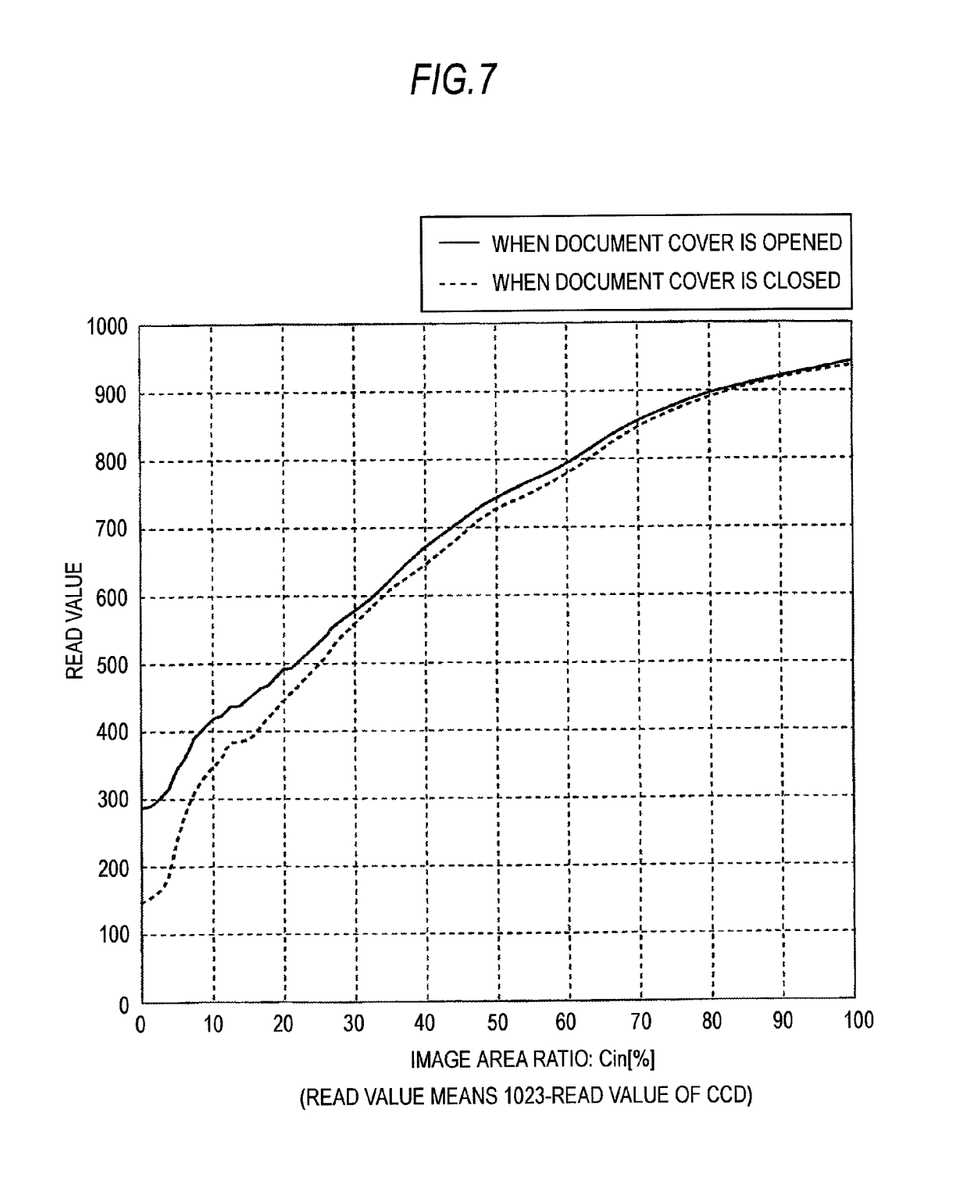
FIG. 7 is a graph illustrating a read value at each image area ratio of the gradation test image when the document cover is opened or closed.

In this case, as shown in FIG. 7, the read data (read value) of the test chart obtained by the image reading device 2 is different when the document cover 52 is closed (Close) and when the document cover 52 is opened (Open). Therefore, in the structure in which gradation correction is performed on the basis of the read data obtained when the document cover is closed, it is difficult to accurately perform the gradation correction (the creation of gradation correction data). The read value shown in FIG. 7 means a value converted from the output value (1023—read value of CCD) of a CCD since it is treated so as to be associated with density.

In the image forming apparatus 1, as shown in FIG. 6, when the test chart 9B is placed on the reading surface 51 of the image reading device 2 and the reading operation (operation) is performed in the automatic gradation correction mode, a process of detecting the opened/closed state of the document cover 52 is performed (S20). When it is detected that the document cover 52 is not closed (that is, the document cover 52 is opened), information to prompt the user to close the document cover 52 is notified to the user (S21).

In the detection of the opened/closed state of the document cover 52, as shown in FIG. 5, a detection region 8 for detecting the opened/closed state is formed in a portion of the sheet 9, which is the test chart 9B, and read data Dn obtained when the image reading device 2 reads the detection region 8 is compared with normal read data Dx that is set on the basis of the read value when the image reading device 2 normally reads the detection region 8 in advance with the document cover 52 being closed. In this case, it is examined whether the difference between the read data Dn and the normal read data Da is more than a predetermined value (a predetermined determination threshold value for determining whether the document cover is opened) Dx. In this way, it is detected whether the document cover 52 is not closed (Step S20 of FIG. 6). In this case, the determination threshold value Dx is set as, for example, normal read data Da+α. The value of α may be calculated by, for example, experiments.

In the first exemplary embodiment, as shown in FIG. 5, a region (white portion: a surface portion of the sheet 9) 81 in which the gradation test image 7 (including the positioning toner images 71 to 74) is not formed is used as the detection region 8 of the test chart 9B. The position where the white portion 81 serving as the detection region is formed is not particularly limited as long as it can be read by the image reading device 2 in the range of the sheet 9.

When the white portion 81 is used as the detection region 8, the value of the read data of the white portion 81 when the document cover 52 is opened is more than that of the read data when the document cover 52 is closed. For example, when the image area ratio shown in FIG. 7 is "0%", the read value when the document cover is opened is different from the read value when the document cover is closed. From this viewpoint, since a region in which the image area ratio of the gradation test image 7 is "0%" corresponds to the base of the sheet 9, the region in which the image area ratio of the gradation test image 7 is "0%" may be set and used as the detection region 8.

As described above, the document pressing surface 52a (see FIG. 3B) of the document cover 52 is a white surface (white background). When the white portion 81 is read with the document cover 52 being closed, light emitted from the illuminating lamp 53 is reflected from the white document pressing surface 52a of the document cover 52 and is then received by the image sensor 54. Therefore, the read value is reduced. In contrast, when the white portion 81 is read with the document cover 52 being opened, the document cover 52 is not disposed above the white portion 81 and no light is reflected from the white document pressing surface 52a. As a result, the amount of reflected light RL received by the image sensor 54 is reduced and the read value increases. That is, the amount of reflected light of illumination light passing through the white portion 81 of the sheet 9 is different and the read value varies.

As such, the detection method according to the first exemplary embodiment uses a variation in the read value (read data) of the white portion 81. In addition, in the detection method, the normal read data Da is not necessarily prepared in order to set the determination threshold value Dx, but the threshold value may be directly calculated and set by, for example, experiments. The determination threshold value Dx may be selected and used different values depending on the kinds (in particular, the kinds of sheets having different light reflection characteristics or transmission characteristics) of sheet 9 used for the test chart 9B.

As shown in FIG. 6, after it is checked that the arrangement of the test chart 9B is correct (including that the test chart 9B is in place), it is detected and determined whether the document cover 52 is opened or closed. In this way, with the test chart 9B being actually placed on the reading surface 51, the reading of the detection region 8 (white portion 81) is performed normally. For example, when the arrangement of the test chart 9B is not correct or when the test chart 9B is not placed on the reading surface 51, the read value of the detection region 8 (in this example, the white portion 81) is not accurate.

As an example of the display of information to prompt the user to close the document cover 52, a message "Please close the document cover and press the read button once" is displayed on the display of the operation panel 15. In addition, instead of the display method, other notification methods, such as the generation of a warning sound and the turning-on of a warning lamp, may be used.

The image forming apparatus 1 detects the opened/closed state of the document cover 52 and notifies the opening of the document cover 52 to the user by displaying information indicating the opening of the document cover 52 when the document cover 52 is not closed. Therefore, it is possible to prevent the test chart 9B from being read with the document cover 52 being opened. As a result, the image reading device 2 normally reads the test chart 9B and automatic gradation correction is accurately performed.

[Second Exemplary Embodiment]

Figure 8:
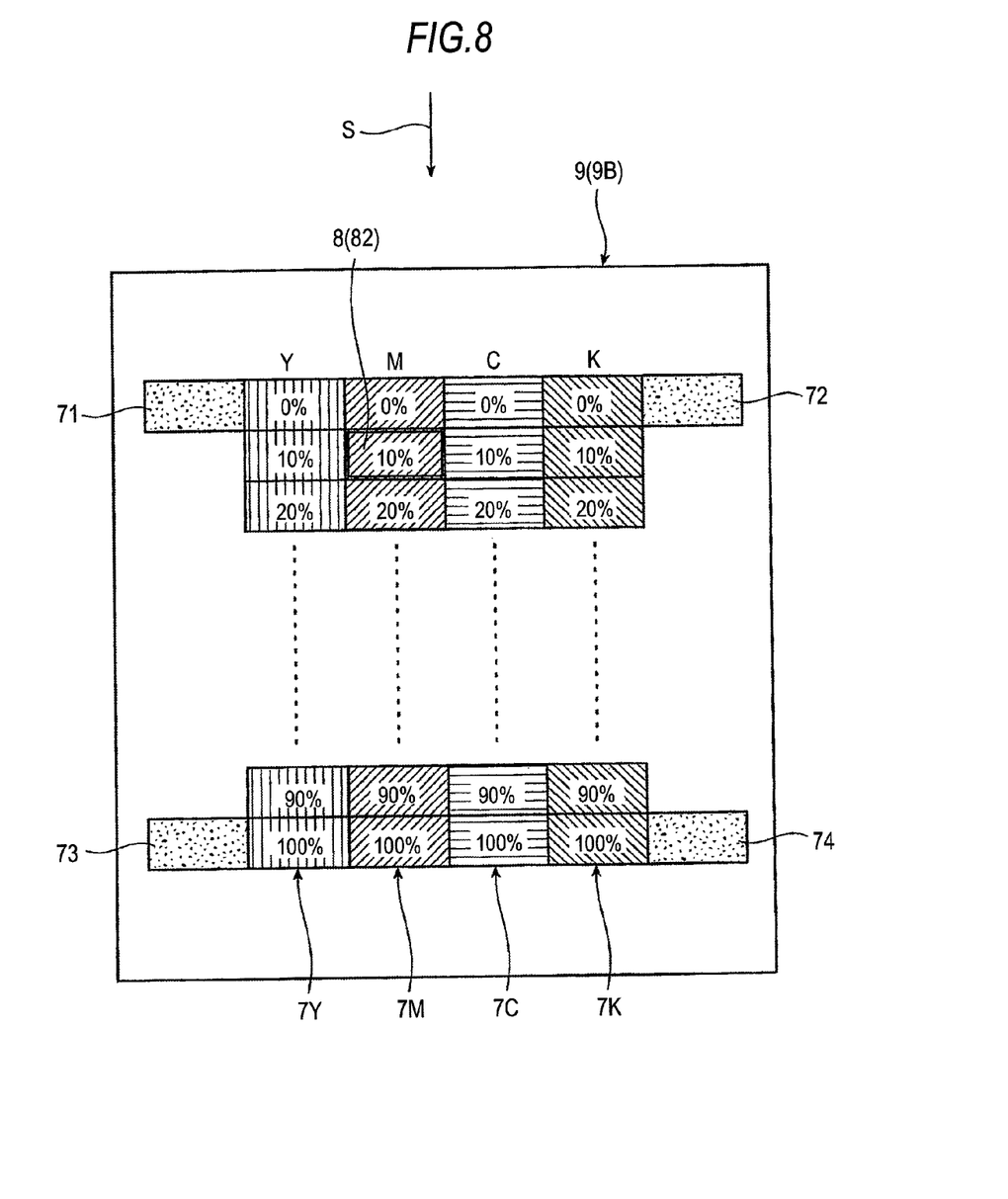
FIG. 8 is a plan view illustrating the structure of a test chart in the automatic gradation correction mode and the structure of a detection region (detection image portion) used in a second exemplary embodiment.

FIG. 8 shows an image forming apparatus according to a second exemplary embodiment and shows a test chart 9B in which a new detection region 8 (test image portion 82) is formed and which is used, in particular, in the automatic gradation correction mode.

In the second exemplary embodiment, in order to detect the opened/closed state of the document cover 52, the test chart 9B in which a portion of the gradation test image 7 is formed as the detection region 8 (detection image portion 82) is used. In this exemplary embodiment, a portion of the magenta gradation test image 7M with an image area ratio of "10%" is used as the detection image portion 82.

As shown in FIG. 7, the read value of the gradation test image 7M (detection image portion 82) with an image area ratio of "10%" is different when the document cover 52 is closed and when the document cover 52 is opened. That is, even when the toner forming the gradation test image is present in the sheet 9, the amount of reflected light passing through the sheet 9 varies depending on the opening or closing of the document cover 52, which results in a variation in the read value. In the second exemplary embodiment, the read value of a portion of the gradation test image 7 is likely to vary, and the portion of the gradation test image 7 is used as the detection region 8 (detection image portion 82). The variation in the read value is used to detect the opened/closed state of the document cover 52.

In this case, the read data Dn read by the detection image portion 82 is compared with a determination threshold value Dy that is set for the detection image portion 82, instead of the determination threshold value Dx according to the first exemplary embodiment, thereby determining whether the document cover 52 is closed (Step S20 shown in FIG. 6).

The detection image portion 82 may be detected in any portion of the gradation test image 7 in which there is a difference between the read value when the document cover 52 is closed and the read value when the document cover 52 is opened. In addition, for a region (x, y) of the gradation test image 7 that can be used to detect the detection image portion, a read value Iopen when a reading operation is performed with the document cover 52 being opened without arranging the test chart 9B on the reading surface 51 may satisfy the conditions of the following Expression 1:

$$\{x, y | (Iopen - Ith1) > (Ipatch(x, y) + Ith2)\}. \quad \text{[Expression 1]}$$

In Expression 1, Ipatch (x, y) is the read value of the gradation test image 7 (x) at an image area ratio (y), Ith1 is the lower limit of a variation in the read value when the document cover is opened, and Ith2 is the upper limit of a variation in the read value of each color gradation test image 7, which is the detection image portion 82. That is, Expression 1 means that it is necessary to use a region in which the read value Ipatch (x, y) of the gradation test image 7 serving as the detection image portion 82 used to detect the opened/closed state of the document cover 52 is reliably less than the read value Iopen even though a variation in each read value is considered. In practice, it is considered that a half-tone portion or a highlight patch portion is suitable as a portion of the gradation test image 7 that can be used as the detection image portion 82. The opened/closed state of the document cover 52 may be detected from the relationship between the read value Iopen of the region (x, y) of the gradation test image 7 used to detect the opened/closed state of the document cover 52 and the read value Ipatch (x, y).

When it is considered that a reading error occurs in a portion of the gradation test image 7 that can be used as the detection image portion 82 of the detection region 8, which is the detection region 8, a portion of the gradation test image 7 with an image area ratio of 30% or less may be used as the detection image portion 82. However, there is a concern that the performance of reading the detection image portion 82 will vary depending on, for example, environmental variation, deterioration of the performance of the image reading device 5 and the image forming apparatus 2 over time, or print (output) density. Therefore, it is preferable that an image portion with an image area ratio of 20% or less be used as the detection image portion 82, considering the above-mentioned situations.

[Third Exemplary Embodiment]

FIG. 9 shows an image forming apparatus according to a third exemplary embodiment and shows another method of detecting the opened/closed state of the document cover 52 which is used, in particular, in the automatic gradation correction mode.

In the third exemplary embodiment, in order to detect the opened/closed state of the document cover 52, at least a portion of a region 51b (a region other than the region in which the test chart is placed or a region in which the test chart is less likely to be placed) of the reading surface 51 of the image reading device 5 in which the test chart 9B is absent is formed as the detection region 8 (detection region surface 84). In this exemplary embodiment, a portion (a portion adjacent to the short side of test chart 9B) of the region 51b that is disposed on the downstream side in a direction S in which the test chart 9B is read is used as the detection region surface 84.

The read value of the region 51b in which the test chart 9B is not placed is different when the document cover 52 is closed and when the document cover 52 is opened. That is, even when the test chart 9B is not placed on the reading surface 51, there is a difference in the amount of reflected light passing through the reading surface 51 between when the document cover 52 is opened (absent) and when the document cover 52 is closed (present), which results in a variation in each read value. In the third exemplary embodiment, the read value of the region 51b of the reading surface 51 in which the test chart 9B is absent is likely to vary, and a portion of the region 51b is used as the detection region 8 (detection region surface 84). The variation in the read value is used to detect the opened/closed state of the document cover 52.

In this case, the read data Dn of the detection region surface 84 is compared with a determination threshold value Dz set for the detection region surface 84, instead of the determination threshold value Dx according to the first exemplary embodiment (or the determination threshold value Dy according to the second exemplary embodiment), thereby determining whether the document cover 52 is closed (Step S20 shown in FIG. 6). In this case, the sheet size of the test chart 9B is acquired from, for example, information input to the gradation test image data storage unit 62 or the control unit 18. Therefore, a predetermined region of the reading surface 51 other than the acquired sheet size corresponds to the detection region surface 84. That is, the region 51b may be determined from the size of the sheet 9 used to create the test chart 9B and a portion of the region 51b may be used as the detection region surface 84.

In this case, the detection region surface 84 is set by the size of the sheet 9 used to create the test chart 9B or the size of the reading surface 51. In addition to the detection region surface 84 shown in FIG. 9, for example, detection regions of the region 51b shown in FIGS. 10A and 10B may be set.

Figure 10A:
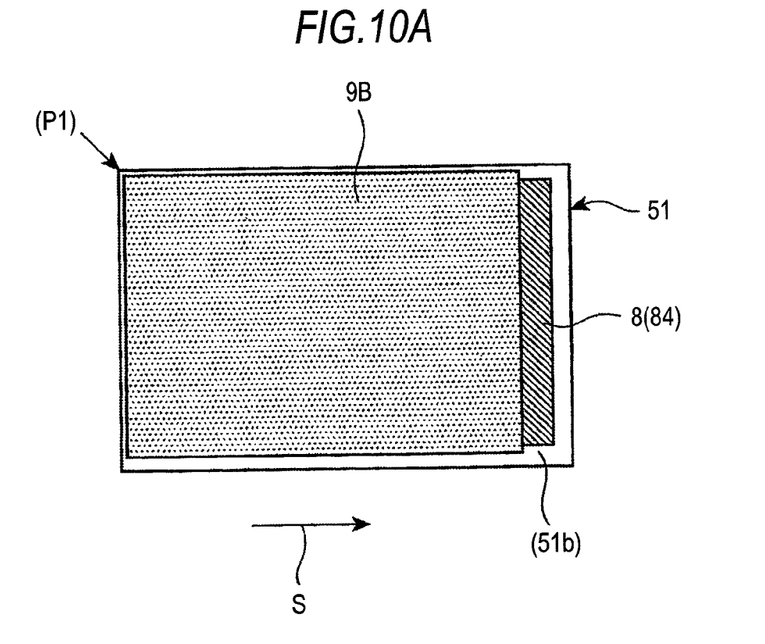
FIGS. 10A and 10B are plan views illustrating another structure of the detection region (detection region surface) used in the automatic gradation correction mode in the third exemplary embodiment.
Figure 10B:
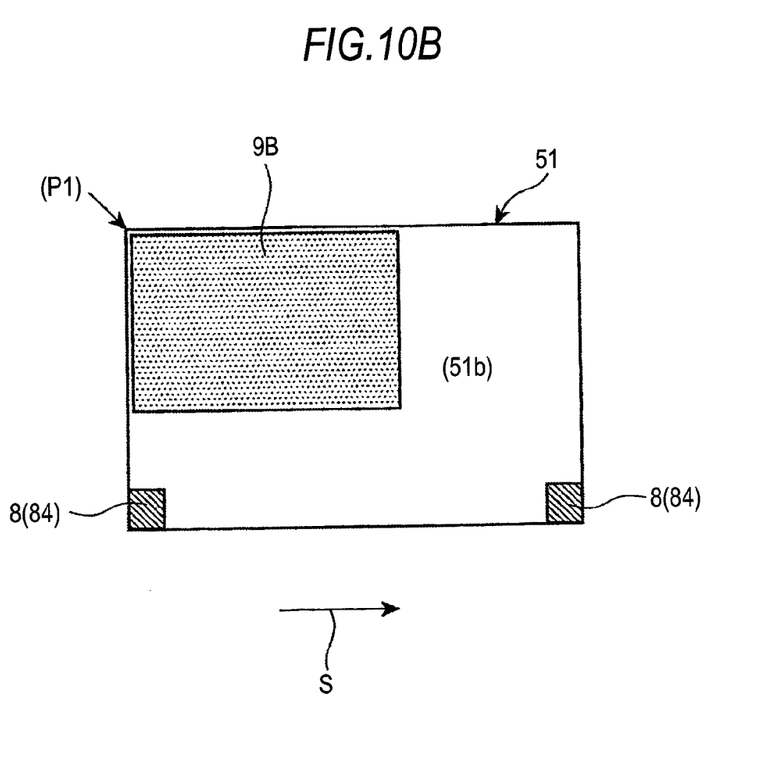

FIG. 10A shows an example of the setting of the detection region surface 84 when the test chart 9B is formed using the sheet 9 with the maximum size that can be used in the image forming apparatus 1. In this case, the size of the reading surface 51 is more than the maximum size of the sheet 9 and a small region 51b in which the test chart 9B is absent is provided. Therefore, at least a portion of the small region 51b can be used as the detection region surface 84. FIG. 10B shows an example in which corners of the region 51b of the reading surface 51 where the test chart 9B (even when the sheet 9 with the maximum size is formed) is not placed certainly are used as the detection region surface 84, regardless of the sheet size of the test chart 9B.

[Fourth Exemplary Embodiment]

Figure 11:
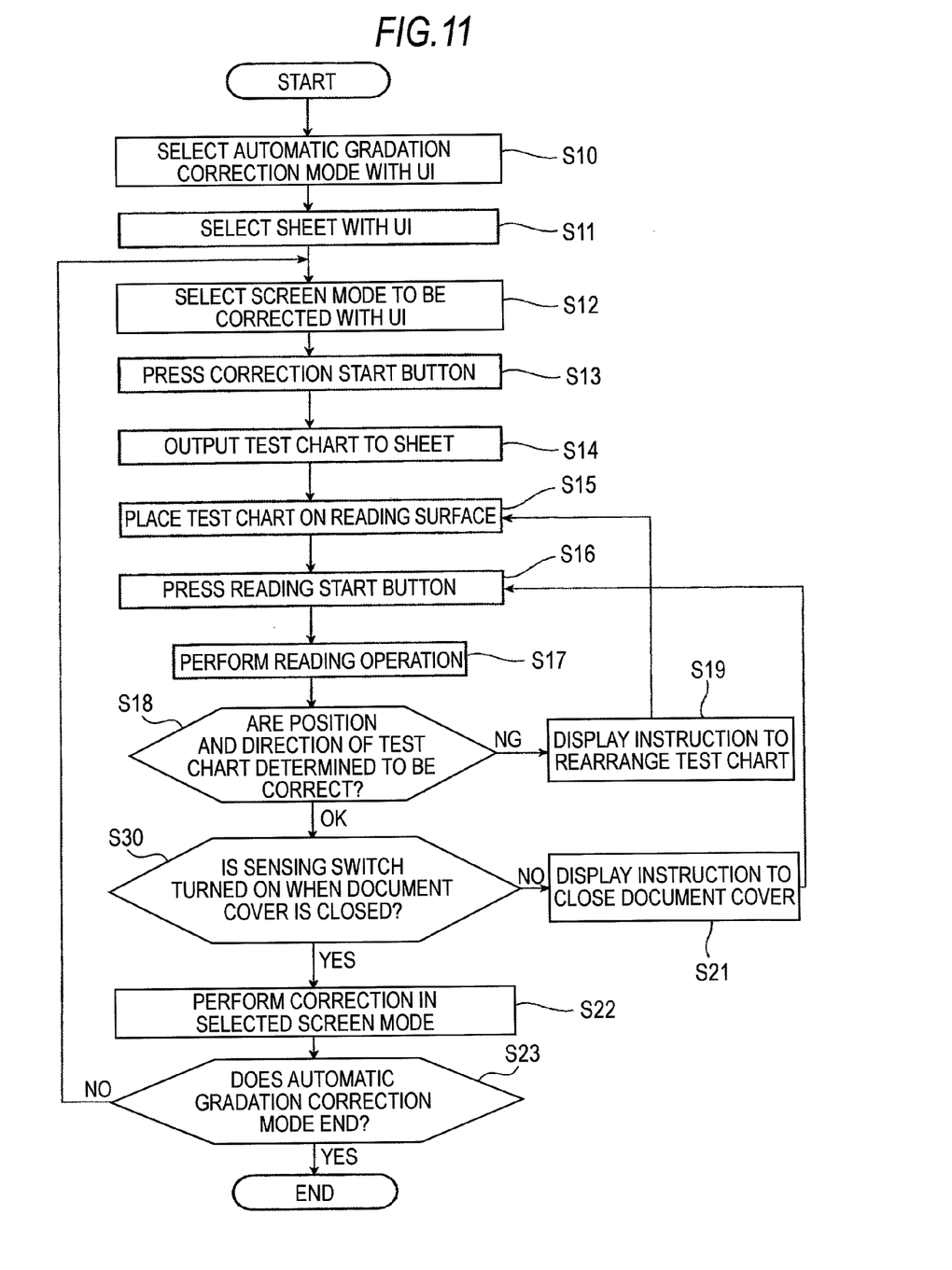
FIG. 11 is a flowchart illustrating the content of an operation when the automatic gradation mode is selected in a fourth exemplary embodiment.

FIG. 11 is a diagram illustrating an image forming apparatus according to a fourth exemplary embodiment and shows another method of detecting the opened/closed state of the document cover 52 used, in particular, in the automatic gradation correction mode.

In the fourth exemplary embodiment, first, as shown in FIG. 3B, a sensing switch 19 that can sense the closed state of the document cover 52 is provided in the housing 50 of the document reading device 5 and the sensing signal of the sensing switch 19 is used to detect the opened/closed state of the document cover 52 in the automatic gradation correction mode. In the fourth exemplary embodiment, the sensing switch 19 is a type in which, when the document cover 52 is closed, a rod-shaped detecting member is pressed downward and is moved so as to be buried in the housing 50 and the movement of the detecting member is detected (ON state). As shown in FIG. 4, the sensing signal of the sensing switch 19 is transmitted to the control unit 18.

In this case, as shown in Step 30 of FIG. 11, after the operation of reading the test chart 9B is performed and the arrangement of the test chart 9B is determined to be correct, the control unit 18 checks whether the sensing switch is turned "on", thereby determining whether the document cover 52 is closed. In this case, when it is determined that the sensing switch 19 is turned "on", information to prompt the user to close the document cover 52 is displayed (S21), similarly to, for example, the first exemplary embodiment. When the document cover 52 is closed, the user performs the operation of reading the test chart 9B again (S16).

[Other Exemplary Embodiments]

In the method of detecting the document cover according to the third exemplary embodiment, when the operation of reading the test chart 9B is performed and it is determined that the document cover is opened (is not closed), a warning message is displayed on, for example, the display of the operation panel 15 to notify the occurrence of an error to the user. However, the notifying unit may not be provided.

In this case, for example, the read value obtained by the document reading device 5 may be compared with the read value (data) normally obtained when the document cover is closed and control may be performed such that the read value is corrected close to the normal read value. In this case, the user does not need to perform, for example, a complicated operation of closing the document cover.

The method of detecting the document cover according to the third exemplary embodiment may be combined with the detection methods according to the first and second exemplary embodiments. In addition, the method of detecting the document cover according to the fourth exemplary embodiment may be combined with the detection methods according to the first to third exemplary embodiments. In this way, it is possible to accurately detect whether the document cover 52 is closed in the automatic gradation correction mode.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best exampling the principles of the invention and its practical applications, thereby enabling others skilled in the art to understand the invention for various exemplary embodiments and with the various modifications as are suited to the particular use contemplated. It is intended that the scope of the invention is defined by the following claims and their equivalents.

What is claimed is:

1. An image forming apparatus comprising:
    an image output unit that forms a gradation test image on a recording sheet and outputs the recording sheet having the gradation test image formed thereon;
    an image reader that covers the recording sheet placed on a reading surface of the image reader with an openable cover plate and optically reads the recording sheet to obtain read data of the gradation test image and read data of a detecting area of the recording sheet;
    a detecting unit that detects, when the image reader optically reads the recording sheet, an opened/closed state of the openable cover plate by reading the detecting area of the recording sheet and using the read data of the detecting area that is inside a portion of the recording sheet; and
    a gradation correction unit that, when the detecting unit detects that the openable cover plate is in the closed state, conducts a gradation correction of the image forming apparatus using the read data of the gradation test image;
    wherein the detecting unit detects the opened/closed state of the openable cover plate by comparing the read data of the detecting area that is inside the portion of the recording sheet with a threshold value indicating the closed state of the openable cover plate.

2. The image forming apparatus according to claim 1, wherein the gradation correction unit conducts, when the detecting unit detects that the openable cover plate is in the closed state, the gradation correction of the image forming apparatus by correcting a gradation of the read data of the gradation test image so as to be close to a standard gradation correction data.

3. The image forming apparatus according to claim 1, wherein a portion out of the gradation test image and inside the recording sheet is used as the detecting area.

4. The image forming apparatus according to claim 1, wherein a portion of the gradation test image of the recording sheet is formed as the detecting area.

5. The image forming apparatus according to claim 1, further comprising:
    a notifying unit that notifies an error to a user when the detecting unit detects that the openable cover plate is not closed.

6. The image forming apparatus according to claim 1, further comprising:
    a position detect unit that detects a placing position of the recording sheet having the gradation test image formed thereon when being placed on the reading surface of the image reader.

* * * * *